United States Patent [19]

Kautz

[11] Patent Number: 5,549,272
[45] Date of Patent: Aug. 27, 1996

[54] COMBINATION PRESSURE PULSATION DAMPER AND CHECK VALVE DEPRESSOR

[75] Inventor: Thomas O. Kautz, Mequon, Wis.

[73] Assignee: Johnson Service Company, Milwaukee, Wis.

[21] Appl. No.: 289,282

[22] Filed: Aug. 11, 1994

[51] Int. Cl.$^6$ .............................. F16L 29/00; F16L 55/04
[52] U.S. Cl. ..................... 251/118; 251/149.1; 251/149.4
[58] Field of Search .................................. 251/149.4, 118, 251/119, 123, 126, 127, 149.1; 137/557

[56] References Cited

U.S. PATENT DOCUMENTS

| | | | |
|---|---|---|---|
| 2,524,052 | 10/1950 | Grant, Jr. | 251/118 X |
| 2,810,541 | 10/1957 | Thomas | 251/118 |
| 3,807,456 | 4/1974 | Colletti | 251/368 X |
| 5,197,330 | 3/1993 | Onodera | 137/557 X |

Primary Examiner—Kevin Lee
Attorney, Agent, or Firm—Harness, Dickey & Pierce, P.L.C.

[57] ABSTRACT

An apparatus for coupling a fluid-responsive device with a valve which includes an actuator. The valve responds to actuation of the actuator by opening a fluid path within the valve in response to the actuator being in a first position and by closing the fluid path in response to the actuator being in a second position. The apparatus comprises a coupler having a first engagement structure for fixedly engaging the fluid-responsive device at a first end, a second engagement structure for fixedly engaging the valve at a second end, and a passage between the first end and the second end. The apparatus further comprises a damper fixedly situated substantially blocking the passage. The damper is generally capillarized to establish a network of capillary vias through the damper. Still further, the apparatus comprises an extension formed integrally with the damper and proportioned to move the actuator when the valve is fixedly engaged at the second end.

19 Claims, 1 Drawing Sheet

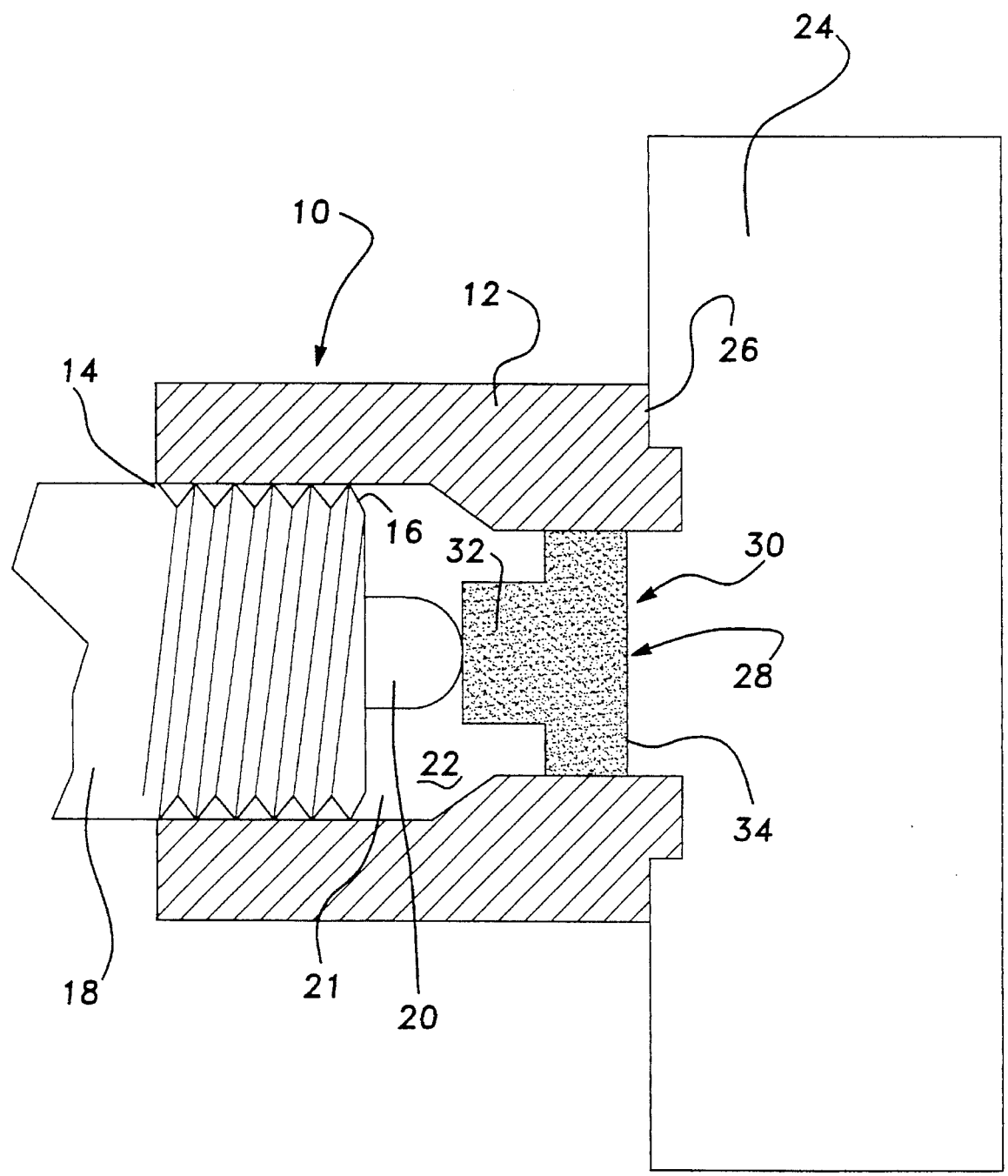

COMBINATION PRESSURE PULSATION DAMPER AND CHECK VALVE DEPRESSOR

BACKGROUND OF THE INVENTION

The present invention is intended for use with a fluid-responsive device and a valve for connection with a fluid system. In particular, in its preferred embodiment the present invention comprises a coupling for connecting a pressure switch connection with a valve associated with a compressor in a refrigeration system.

In refrigeration systems, as in many other fluid-type systems, the fluid within the system is toxic or otherwise environmentally harmful. Its escape from the system, especially during connection or disconnection of a pressure switch to a valve within the system, is undesirable. Accordingly, one must ensure that fluid flow-restricting connection of the pressure switch to the valve is effected so that fluid escape from the system is substantially impeded before the valve is actuated to allow fluid communication through the valve.

Further, it is often necessary to damp fluid pressure variations in order that the operation of the pressure switch responsive to fluid pressure is smoothly effected rather than being responsive to every variation of fluid pressure. Such damping has been effected in prior art devices via a number of different approaches. For example, in refrigeration systems where a pressure switch is employed to limit high or low pressure of a refrigerant, and in which high pressure is on the order of perhaps 500 pounds per square inch (psi), unsteady pressure is not infrequently encountered, especially at the high pressure end. To protect the bellows inside the pressure switch (a common pressure-responsive mechanism), there is a need for damping the variations, especially at high pressure. Prior art approaches to providing such damping have included providing a small aperture for access to the bellows; a small aperture with a wire through the aperture to aid in keeping the aperture clean and clear of contaminant build-up; and a capillary tube, which comprises in its most-commonly found embodiment a long copper tube between the pressure switch bellows access and the fluid system access valve. Such a capillary tube allows a larger diameter aperture to be employed (therefore avoiding blockage by contaminants), and generally requires about three feet of tube length in order to assure proper damping is effected.

Another prior art approach to such a damping mechanism is to provide a powdered metal interface between the refrigerant system and the interior bellows or other actuating system of the pressure switch. Such powdered metal interfaces are manufactured under predetermined conditions involving such parameters as particle size, pressure, binder, and the like, to assure that the damper interface is generally capillarized. Thus there is established a network of capillary vias through the damper interface which allow fluid communication through the damper interface while sufficiently damping variations in pressure to protect the pressure switch.

A number of structures have been incorporated in connection with prior art dampers for ensuring automatic actuation of the valve to which the damper is connected as the connection is made. Known structures generally have been specialized structures which significantly add to the cost of making the damper coupler, such as providing cross-members within the coupler to depress the valve stem or otherwise actuate the valve. Another structure provided reduced diameter sections within the coupler connecting a pressure switch with a valve.

It would be useful to provide a simple inexpensive device or structure to accomplish the dual functions of damping fluctuations in fluid pressure to protect interior mechanisms of a pressure switch and timely depressing (actuating) the valve to which the pressure switch is connected by the coupler.

It would also be useful to provide such a device which would actuate the valve automatically during connection to the valve, but where such valve actuation would occur only after sufficient engagement of the coupler with the valve is effected to ensure fluid flow-restricting coupling in order that release of the fluid to the atmosphere may be substantially limited.

SUMMARY OF THE INVENTION

The present invention is an apparatus for coupling a fluid-responsive device with a valve which includes an actuator. The valve responds to actuation of the actuator by opening a fluid path within the valve in response to the actuator being in a first position and by closing the fluid path in response to the actuator being in a second position. The apparatus comprises a coupler having a first engagement structure for fixedly engaging the fluid-responsive device at a first end, a second engagement structure for fixedly engaging the valve at a second end, and a passage between the first end and the second end. The apparatus further comprises a damper fixedly situated substantially blocking the passage. The damper is generally capillarized to establish a network of capillary vias through the damper. Still further, the apparatus comprises an extension formed integrally with the damper and proportioned to move the actuator when the valve is fixedly engaged at the second end.

In its preferred embodiment, the damper is comprised of powdered metal. The passage is bounded by an inner periphery of substantially cylindrical configuration adjacent the second end and the inner periphery and the valve are configured to cooperate to effect threaded fixed engagement of the valve with the coupler. In its most preferred embodiment, the valve and coupler cooperate to effect fluid flow-restricting engagement before the extension sufficiently moves the actuator to open the fluid path.

It is, therefore, an object of the present invention to provide an apparatus for coupling a fluid-responsive device with a valve which provides an integrally-formed extension with a damper, the extension being proportioned to move an actuator on the valve when the valve is fixedly engaged in a predetermined manner with the apparatus.

It is a further object of the present invention to provide an apparatus for coupling a fluid-responsive device with a valve which is made of powdered metal.

It is a still further object of the present invention to provide an apparatus for coupling a fluid-responsive device with a valve which effects threaded engagement with the valve and cooperates with the valve to effect fluid flow-restricting engagement before the extension sufficiently moves the actuator to open the fluid path.

Further objects and features of the present invention will be apparent from the following specification and claims when considered in connection with the accompanying drawings illustrating the preferred embodiment of the invention.

BRIEF DESCRIPTION OF THE DRAWINGS

The drawing is a partially-sectioned schematic drawing of the preferred embodiment of the present invention.

DETAILED DESCRIPTION OF THE INVENTION

The drawing is a partially-sectioned schematic drawing of the preferred embodiment of the present invention.

In the drawing, a coupler 10 is illustrated in partial section as having a coupler body 12 which may be manufactured of a variety of materials. Coupler body 12 is commonly made of brass and is generally configured to accommodate tightening by a wrench or similar tool to engage internal threads 14 in a cavity 21 with external threads 16 on a valve 18.

Details of valve 18 (except for its threaded structure for engagement with coupler 10 and its actuator 20) are omitted in this description in order to simplify the description and focus on the novel aspects of the present invention. Actuator 20 of valve 18 is of a type wherein depression of actuator 20 toward valve 18 opens a fluid path (not shown in the drawing) through valve 18 to facilitate fluid communication from a refrigeration system (not shown) to a chamber 22 which is established when valve 18 is threadedly engaged with coupler body 12.

A pressure switch 24 is affixed to an end 26 of coupler body 12, which affixation may be made by any of a number of methods including welding, threaded engagement, adhesive engagement, or any other engagement means providing fluid-tight connection of valve body 12 with pressure switch 24. A passage 28 is provided within coupler body 12 for establishing fluid communication intermediate chamber 22 and pressure switch 24. Pressure switch 24 has bellows or some other mechanism responsive to fluid pressure (not shown) for operation of pressure switch 24.

Situated in a blocking orientation within passage 28, and suitably secured such as by friction fit, welding or adhesive, is a damper 30. Damper 30 is constructed of a powdered metal composition which is formed to be a capillarized structure providing a network of capillary vias through damper 30 accommodating fluid communication intermediate chamber 22 and pressure switch 24 through passage 28 while providing a damping effect to variations in pressure of fluid which may occur.

In its preferred embodiment, the formulation of damper 30 is controlled in order that damper 30 may provide substantially the same damping effect as a predetermined length of copper tubing of a predetermined diameter.

Damper 30 includes an actuator extension 32, or turricular promontory which is, preferably, integrally formed with damper 30 during the manufacturing process which produces damper 30. Thus, actuator extension 32 is also composed of powdered metal and is capillarized to substantially the same degree that damper 30 is capillarized. Actuator extension 32 extends from base portion 34 of damper 30 into chamber 22 toward valve 18. Actuator extension 32 is preferably proportioned so that threaded engagement of valve 18 within cavity 21 by engagement of threads 14, 16 proceeds sufficiently within cavity 21 to ensure fluid flow-restricting engagement of valve 18 with coupler body 12 before actuator extension 32 depresses actuator 20 of valve 18 sufficiently to establish fluid communications between the refrigeration system (not shown) and pressure switch 24 via valve 18 and, chamber 22, and passage 28.

It is to be understood that while the detailed drawing and specific examples given describe preferred embodiments of the invention, they are for the purpose of illustration, that the apparatus and method of the invention are not limited to the precise details and conditions disclosed, and that various changes may be made therein without departing from the spirit of the invention which is defined by the following claims.

What is claimed is:

1. An apparatus for coupling a fluid-responsive device with a valve, said valve including an actuator; said valve responding to actuation of said actuator by opening a fluid path within said valve in response to said actuator being in a first position and by closing said fluid path in response to said actuator being in a second position; the apparatus comprising:

a coupler; said coupler having a first engagement structure for fixedly engaging said fluid-responsive device at a first end, a second engagement structure for fixedly engaging said valve at a second end, and a passage between said first end and said second end;

a damper; said damper being fixedly situated substantially blocking said passage; said damper being generally capillarized to establish a network of capillary vias through said damper; and an extension; said extension being formed integrally with said damper and being proportioned to move said actuator when said valve is fixedly engaged at said second end.

2. An apparatus for coupling a fluid-responsive device with a valve as recited in claim 1 wherein said damper is comprised of powdered metal.

3. An apparatus for coupling a fluid-responsive device with a valve as recited in claim 1 wherein said passage is bounded by an inner periphery of substantially cylindrical configuration adjacent said second end; said inner periphery and said valve being configured to cooperate to effect threaded fixed engagement of said valve with said coupler.

4. An apparatus for coupling a fluid-responsive device with a valve as recited in claim 3 wherein said valve and said coupler cooperate to effect fluid flow-restricting engagement before said extension sufficiently moves said actuator to open said fluid path.

5. An apparatus for coupling a fluid-responsive device with a valve as recited in claim 4 wherein said damper is comprised of powdered metal.

6. An apparatus for coupling a fluid-responsive device with a valve as recited in claim 5 wherein said damper is frictionally retained within said passage.

7. An apparatus for coupling a fluid-responsive device with a valve as recited in claim 5 wherein said damper is adhesively retained within said passage.

8. An apparatus for coupling a fluid-responsive device with a valve as recited in claim 5 wherein said damper is weldingly retained within said passage.

9. An apparatus for coupling a pressure switch with a valve in a refrigeration system; said valve having a valve body oriented generally on an axis and an axially oriented actuator, said actuator opening said valve when said actuator is depressed toward said valve body along said axis; the apparatus comprising:

a coupler; said coupler being configured for fixed engagement with said pressure switch at a first end and configured for threaded engagement with said valve body at a second end; said coupler having a passage intermediate said first end and said second end; said valve body and said passage cooperating to establish a chamber within said coupler generally bounded by said passage and said valve body when said valve body is threadedly engaged with said coupler; and an insert member; said insert member being affixed within said passage in a blocking orientation intermediate said chamber and said first end, said insert member being capillarized to establish a network of capillary vias through said insert member; said insert member having a turricular promontory extending into said chamber toward said valve, said turricular promontory increasingly depressing said actuator toward said valve body as said valve body is progressively threadedly advanced within said passage in effecting said threaded engagement between said valve body and said coupler.

10. An apparatus for coupling a pressure switch with a valve in a refrigeration system as recited in claim 9 wherein said insert member is made of powdered metal.

11. An apparatus for coupling a pressure switch with a valve in a refrigeration system as recited in claim 9 wherein said valve body and said coupler cooperate to effect fluid flow-restricting engagement before said turricular promontory sufficiently depresses said actuator to open said valve.

12. An apparatus for coupling a pressure switch with a valve in a refrigeration system as recited in claim 11 wherein said insert member is comprised of powdered metal.

13. An apparatus for coupling a pressure switch with a valve in a refrigeration system as recited in claim 12 wherein said insert member is frictionally retained within said passage.

14. An apparatus for coupling a pressure switch with a valve in a refrigeration system as recited in claim 12 wherein said insert member is adhesively retained within said passage.

15. An apparatus for coupling a pressure switch with a valve in a refrigeration system as recited in claim 12 wherein said insert member is weldingly retained within said passage.

16. An apparatus for coupling a fluid-responsive device with a valve; said valve including a valve body and an actuator, said actuator opening said valve when said actuator is in a predetermined position; the apparatus comprising:

a coupler; said coupler being configured for fixed engagement with said fluid-responsive device at a first end and configured for threaded engagement with said valve body at a second end; said coupler having a passage intermediate said first end and said second end; and an insert member; said insert member being affixed within said passage in a blocking orientation intermediate said first end and said second end, said insert member being capillarized to establish a network of capillary vias through said insert member; said insert member having a turricular promontory extending toward said valve, said turricular promontory increasingly moving said actuator toward said predetermined position as said valve body is progressively threadedly advanced with respect to said coupler in effecting said threaded engagement between said valve body and said coupler.

17. An apparatus for coupling a fluid-responsive device with a valve as recited in claim 16 wherein said insert member is made of powdered metal.

18. An apparatus for coupling a fluid-responsive device with a valve as recited in claim 16 wherein said valve body and said coupler cooperate to effect fluid flow-restricting engagement before said turricular promontory sufficiently moves said actuator to open said valve.

19. An apparatus for coupling a fluid-responsive device with a valve as recited in claim 18 wherein said insert member is made of powdered metal.

* * * * *